Figure 1:
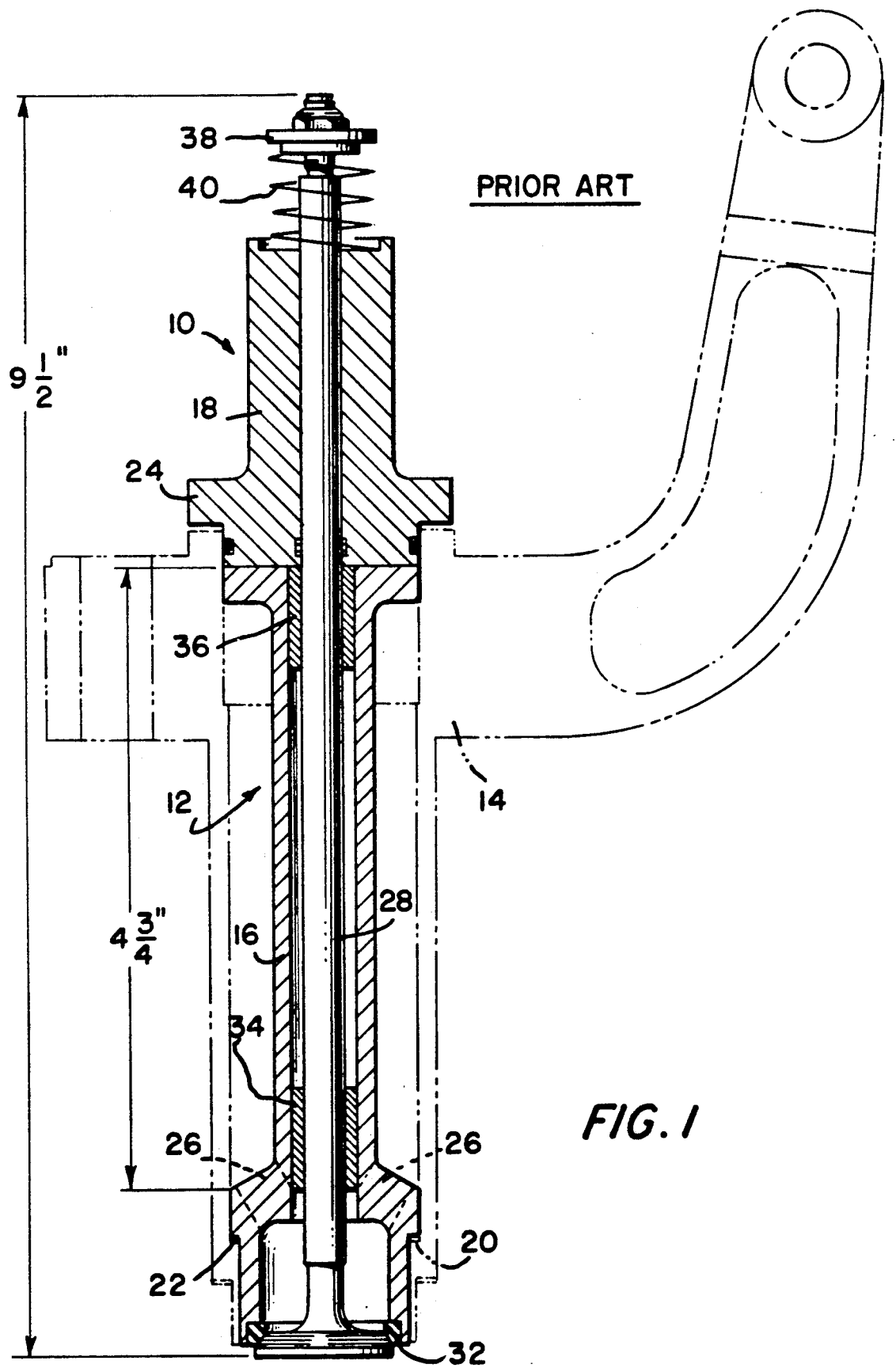

United States Patent

Bentley et al.

Patent Number: 5,106,023
Date of Patent: Apr. 21, 1992

[54] CARTRIDGE-TYPE FUEL INJECTION VALVE ASSEMBLY, FOR EMPLACEMENT WITHIN A VALVE BODY WHICH HAS AN INNER SHOULDER

[75] Inventors: Dale W. Bentley, Little Genesee, N.Y.; Gary F. Bisel, Westfield, Pa.

[73] Assignee: Dresser-Rand Company, Corning, N.Y.

[21] Appl. No.: 582,044

[22] Filed: Sep. 13, 1990

[51] Int. Cl.$^5$ .............................. B05B 1/30
[52] U.S. Cl. .................. 239/533.2; 239/600
[58] Field of Search .......... 239/533.2–533.12, 239/600

[56] References Cited

U.S. PATENT DOCUMENTS 4,365,756 12/1982 Fisher ........................ 239/533.2

FOREIGN PATENT DOCUMENTS 2444597 4/1976 Fed. Rep. of Germany .................. 239/533.12

Primary Examiner—Andres Kashnikow
Assistant Examiner—Karen B. Merritt
Attorney, Agent, or Firm—Bernard J. Murphy

[57] ABSTRACT

The assembly has a one-piece cartridge which has a portion set in a valve body and a portion extending outwardly therefrom. Widely stanced bushings, one within the lower, inner end of the cartridge, and now within an outermost portion thereof, accurately align a reciprocatable valving element with the valve seat therefor. The valve seat is captive between the cartridge and the valve body.

8 Claims, 2 Drawing Sheets

CARTRIDGE-TYPE FUEL INJECTION VALVE ASSEMBLY, FOR EMPLACEMENT WITHIN A VALVE BODY WHICH HAS AN INNER SHOULDER

This invention pertains to cartridge-type fuel injection valve assemblies, such as are used in gas engines, for the injection of fuel gas. Typical thereof are the cartridge-type fuel injection valve assemblies incorporated in TLAD-10 gas engines manufactured and sold by Dresser-Rand Company of Corning, New York. The instant invention concerns an improved configuration of such valve assemblies which are (a) less costly to manufacture, (b) use a one-piece cartridge, in lieu of the former two-piece cartridges, and (c) is wholly interchangeable with the aforesaid two-piece cartridge-type assemblies.

The known types of valve assemblies, to which the invention pertains have a foreshortened bridging of the reciprocable valving element between guiding bushings, and a valve seat which is susceptible of loosening and, consequently, can be dislodged to disable the valve assembly.

What has been needed is an improved cartridge-type valve assembly, for fuel gas injection, which affords a wider bridging of the valving element by its guiding bushings, a captive valve seat, and a less expensive, one-piece cartridge.

It is an object of this invention to set forth just such an improved valve assembly.

It is particularly an object of this invention to disclose a cartridge-type fuel injection valve assembly, for emplacement within a valve body which has an inner shoulder, comprising an elongate, hollow, one-piece cartridge; wherein said cartridge has means intermediate the length thereof for fastening of said cartridge to such valve body to dispose a first portion of said cartridge within such body, and a second portion of said cartridge external of such body; a cylindrical valve seat for clamped engagement between (a) an inner shoulder of such body, and (b) a terminal end of said cartridge; a valving element, reciprocably disposed within said cartridge, having means for sealing closure onto, said a removal from, said seat; a pair of bushings interposed between said element and said cartridge for (a) supporting said element in reciprocation thereof, and (b) properly aligning said closure means with said seat; wherein one of said bushings is disposed in said first portion of said cartridge in near adjacency to one end of said cartridge, and the other of said bushings is disposed in said second portion of said cartridge in near adjacency to a second, opposite end of said cartridge; and means coupled to said element and said second end of said cartridge for urging said closure means into sealing engagement with said seat.

Figure 2:
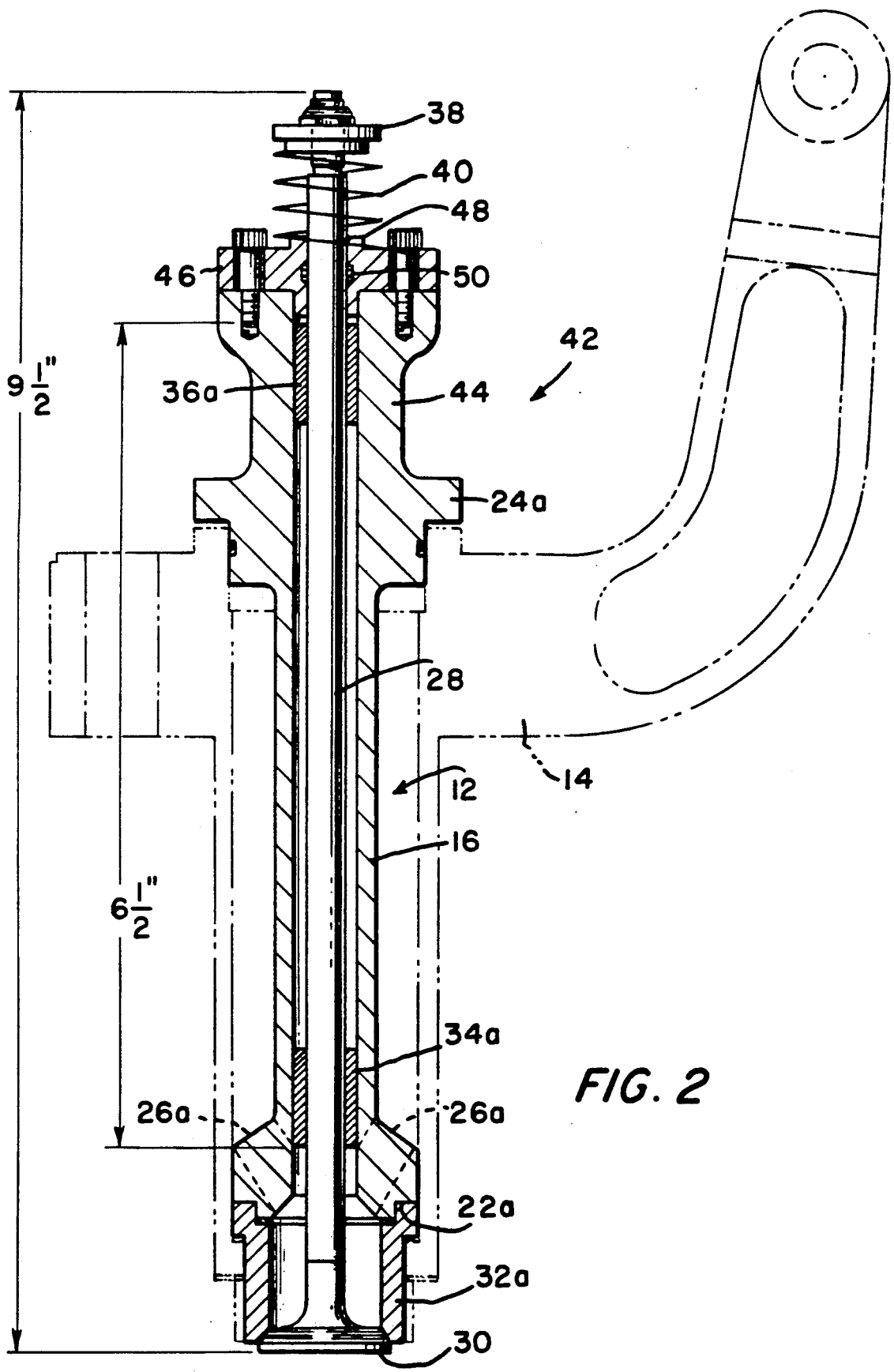

Further objects of this invention, as well as the novel features thereof, will become more apparent by reference to the following description taken in conjunction with the accompanying figures, in which FIG. 1 is a vertical, cross-sectional view of a prior art valve assembly, and FIG. 2 is a vertical, cross-sectional view of an embodiment of the novel valve assembly.

As shown in FIG. 1, a prior art cartridge-type fuel injection valve assembly 10 has a two-piece cartridge 12 for fixing thereof in and to a valve body 14 (shown only in phantom). The cartridge 12 has a first portion 16 which is received fully within the body 14, and a second portion 18 which is substantially externally mounted to the body 14. The body 14 haw an inner shoulder 20 against which an external land or shoulder 22 of the portion 16 is set. The second portion 18 has an annular flange 24 which is used for fastening the portion 18 to the body 14 and securing the portion 16 against the shoulder 20. Ports 26 are formed in the lower end of the portion 16 for admitting fuel gas therethrough. A headed valving element 28 is reciprocably disposed within the portions 16 and 18, the head 30 thereof closing onto, and removing from an annular seat 32 which is fixed in an annular relief formed therefore in the innermost end of portion 16. A pair of bushings 34 and 36 are interposed between the valving element 28 and the portions 16 and 18. A disc 38 is fastened to an end of the valving element 28, and a compression spring 40 is interposed between the disc 38 and the outermost end of portion 18 to urge the head 30 into closure onto the seat 32.

While specified dimensions are not relevant, relative dimensions are and, in this regard, the illustration comprises a valving element 28 which is approximately nine and a half inches in length. The bushings 34 and 36 bridgingly support, therebetween, approximately four and three-quarters of an inch of the valving element 28. Hence, about half the length of the element 28 is beyond the guiding bushings 34 and 36. The seat 32, it can be seen, is captured only when the head 30 is closed thereagainst; the portion 16 does not positively secure it in place.

The improved valve assembly 42, shown in an embodiment thereof in FIG. 2, has a one-piece cartridge 44 with a flange 24a for externally and accessibly fastening thereof to the body 14 with a first portion of the cartridge confined within the body, and a second portion thereof external of the body. The valve seat 32a is of cylindrical form and has a shoulder 22a which sets against the shoulder 20. Cartridge 44 also has ports 26a formed therein as well for the fuel admittance. The innermost end of the cartridge 44 fixes the seat 32a against the shoulder 20, securing it against displacement, and the engaging shoulders 22a and 20 insure that the seat 32a will not fall free.

Bushings 34a and 36a are widely set apart; busing 34a being in near adjacency to the innermost end of the cartridge, in the first portion of the cartridge, and busing 36a is adjacent the outermost end of the cartridge 44, in the second portion thereof and remote from the flange 24a. By this innovation, then, the bushings 34a and 36a bridgingly support, therebetween, approximately six-and-a-half inches of the length of the valving element 28. That is to say that the bushings 34a and 36a support and guide not less than approximately sixty-five percent of the length of the element. This significantly improves the alignment of the head 30 with the seat 32a, as the widely set apart bushings 34a dna 36a offer a widely-stanced, bridging support of the element 28.

Fixed to the outermost end of the cartridge 44 is an annular plate 46 which has a raided boss 48 thereon for retaining the spring 40 in proper position thereat. Too, the plate 46 has an annular groove formed therein in which is seated a sealing element 50; the plate 46 and sealing element 50 cooperate for confiningly sealing bushing 36a within the second, external portion of the cartridge 44.

The overall configuration of the novel valve assembly 42 is such that it is wholly interchangeable with the prior art type valve assemblies. Accordingly, retrofit of existing engines with the new valve assembly can be done with great facility. Manufacture of the new valve assembly 42 is less expensive, at lest in that a carefully precisioned, mated interface of an outer portion or piece with an inner portion or piece end not be undertaken. Too, the flange bolting of an outer piece, which if done improperly can distort the disposition of an inner piece, is no longer a consideration to be contemplated.

While we have described our invention in connection with a specific embodiment of the invention, it is to be clearly understood that this is done only by way of example, and not as a limitation to the scope of the invention as set forth in the objects thereof and in the appended claims.

We claim:

1. A cartridge-type fuel injection valve assembly, for emplacement within a valve body which has an inner shoulder, comprising:

an elongate, hollow, one-piece cartridge; wherein said cartridge has means intermediate the length thereof for fastening of said cartridge externally and accessibly to such valve body to dispose a first portion of said cartridge within said body, and a second portion of said cartridge external of such body;

said fastening means comprises a sole means for securing said first portion of said cartridge within the valve body;

a cylindrical valve seat for clamped engagement between (a) an inner shoulder of such body, and (b) a terminal end of said cartridge;

a valving element, reciprocably disposed within said cartridge, having means for a sealing closure onto, and a removal from, said seat;

a pair of bushings interposed between said element and said cartridge for (a) supporting said element in reciprocation thereof, and (b) properly aligning said closure means with said seat; wherein one of said bushings is disposed in said first portion of said cartridge in near adjacency to one end of said cartridge, and the other of said bushings is disposed (a) in said second portion of said cartridge in near adjacency to a second, opposite end of said cartridge, and (b) remote from said fastening means;

means coupled to said element and said second end of said cartridge for urging said closure means into sealing engagement with said seat; and pate means fastened to said second portion of said cartridge for confiningly sealing said outer bushing within said second portion of said cartridge.

2. A cartridge-type fuel injection valve assembly, according to claim 1, wherein:

said first portion of said cartridge has porting formed therein for admitting fuel therethrough.

3. A cartridge-type fuel injection valve assembly, according to claim 1, wherein:

said bushings bridgingly support therebetween not less than approximately sixty-five percent of the length of said valving element.

4. A cartridge-type fuel injection valve assembly, according to claim 1, wherein:

said urging means comprises a compression spring.

5. A cartridge-type fuel injection valve assembly, according to claim 1, wherein:

said plate means comprises an annular plate fastened to said second end of said cartridge;

an end of said valving element, which is opposite said closure means, has a disc fastened thereto; and said urging means comprises a compression spring interposed between said plate and said disc.

6. A cartridge-type fuel injection valve assembly, according to claim 5, wherein:

said plate has a raised boss formed thereon for retaining said spring in proper position thereat.

7. A cartridge-type fuel injection valve assembly, according to claim 6, wherein:

1 said plate has an annular groove formed therein; and said sealing element is set in said groove.

8. A cartridge-type fuel injection valve assembly, according to claim 5, wherein:

an annular sealing element is interposed between said plate and said valving element.

* * * * *

UNITED STATES PATENT AND TRADEMARK OFFICE
CERTIFICATE OF CORRECTION

PATENT NO. : 5,106,023

DATED : Apr. 21, 1992

INVENTOR(S) : Dale W. Bentley and Gary F. Bisel

It is certified that error appears in the above—identified patent and that said Letters Patent is hereby corrected as shown below:

Column 2, line 2, change "haw" to - - has - - ;

Column 2, line 12, change "therefore" to - - therefor - - ;

Column 2, line 59, change "raided" to - - raised - - ;

Column 3, line 3, change "lest" to - - least - - ;

Column 3, line 5, change "end" to - - need - - ;

Column 4, line 6, change "pate" to - - plate - - ; and

Column 4, line 35, delete "1".

Signed and Sealed this

Eighth Day of June, 1993

Attest:

MICHAEL K. KIRK

Attesting Officer     Acting Commissioner of Patents and Trademarks